(12) United States Patent
Schaefer

(10) Patent No.: US 10,384,421 B2
(45) Date of Patent: Aug. 20, 2019

(54) LAMINATABLE MAGNETIC POUCH

(71) Applicant: Dale Sanford Schaefer, Bessemer, AL (US)

(72) Inventor: Dale Sanford Schaefer, Bessemer, AL (US)

(*) Notice: Subject to any disclaimer, the term of this patent is extended or adjusted under 35 U.S.C. 154(b) by 476 days.

(21) Appl. No.: 14/923,193

(22) Filed: Oct. 26, 2015

(65) Prior Publication Data
US 2016/0121581 A1 May 5, 2016

Related U.S. Application Data

(60) Provisional application No. 62/109,691, filed on Jan. 30, 2015, provisional application No. 62/069,935, filed on Oct. 29, 2014.

(51) Int. Cl.
| | |
|---|---|
| *B32B 7/12* | (2006.01) |
| *B32B 15/04* | (2006.01) |
| *B32B 27/36* | (2006.01) |
| *B32B 23/20* | (2006.01) |
| *B32B 27/06* | (2006.01) |
| *B32B 27/30* | (2006.01) |
| *B32B 27/32* | (2006.01) |
| *B32B 27/34* | (2006.01) |

(52) U.S. Cl.
CPC .......... *B32B 7/12* (2013.01); *B32B 23/20* (2013.01); *B32B 27/06* (2013.01); *B32B 27/304* (2013.01); *B32B 27/32* (2013.01); *B32B 27/34* (2013.01); *B32B 27/36* (2013.01); *B32B 2255/00* (2013.01); *B32B 2307/208* (2013.01); *B32B 2307/31* (2013.01); *B32B 2307/402* (2013.01); *B32B 2307/412* (2013.01); *B32B 2307/414* (2013.01); *B32B 2307/546* (2013.01); *B32B 2307/75* (2013.01); *B32B 2439/00* (2013.01); *B32B 2451/00* (2013.01)

(58) Field of Classification Search
CPC ..... B32B 2307/208; B32B 7/12; B32B 15/04; B32B 2307/31; B32B 2307/75; B32B 2451/00; B32B 27/36; B32B 2255/00; B32B 2307/402; B32B 2307/412; B32B 2307/414; B32B 2307/546; B32B 23/20; B32B 2439/00; B32B 2439/06
See application file for complete search history.

(56) References Cited

U.S. PATENT DOCUMENTS

| | | | | |
|---|---|---|---|---|
| 5,858,510 A | * | 1/1999 | Dressler | B32B 3/30 428/167 |
| 6,235,378 B1 | * | 5/2001 | Lowder | B32B 15/08 428/215 |
| 6,701,654 B2 | * | 3/2004 | Rappaport | G09F 3/20 229/71 |

* cited by examiner

*Primary Examiner* — Yan Lan

(57) ABSTRACT

A laminatable magnetic pouch provides the ability to easily create custom magnets. A laminatable cover sheet is connected at one end to a magnetic backing. A document, such as a photograph or other media substrate, is inserted between the cover sheet and the magnetic backing. Using heat and pressure, the layers of the magnetic pouch are laminated into a single structure capable of adhering to a magnet accepting surface.

11 Claims, 4 Drawing Sheets

LAMINATABLE MAGNETIC POUCH

The current application claims a priority to the U.S. Provisional Patent application Ser. No. 62/069,934 filed on Oct. 29, 2014, and to the U.S. Provisional Patent application Ser. No. 62/109,691 filed on Jan. 30, 2015.

FIELD OF THE INVENTION

The present invention relates generally to decorative magnets. More particularly, the present invention relates to a laminatable magnetic pouch.

BACKGROUND OF THE INVENTION

The present invention relates in general to the field of pouch laminating. More particularly, the present invention relates to a laminating pouch structured to produce flexible magnets. Specifically, the present invention relates to a magnetic pouch comprised of an adhesive coated transparent sheet attached to an adhesive coated flexible magnet; the two structures are sealed along one common peripheral edge creating a pouch.

Pouch Laminators are common in the marketplace, they are built by many manufacturers and vary in design and cost. A pouch laminator is designed specifically to process laminating pouches. There are other types and methods of laminating. For example, roll laminating is the method of unwinding one or more substrates from rolled material and combining these substrates between pressured rolls, thus creating a single structure. Another example would be platen laminating. Platen laminating is the method of layering multiple pieces of a sheeted substrate, placing this layered stack of material in a platen laminator, applying heat and pressure for a period of time long enough to laminate all of the layers into a single structure.

Laminating pouches are common in the marketplace. Laminating pouches come in a variety of sizes, shapes and film thicknesses. The definitive design of a laminating pouch is comprised of two separate sheets of laminatable substrate bound together by a single seal transversing one peripheral edge. The substrates are most generally comprised of a transparent polyester film coated with an inner layer of thermoplastic adhesive resin activatable by heat and pressure. The primary function of a laminating pouch is to provide the user with a simple and economical way to protect documents or photographs from deterioration, it also works to enhance the astatic appearance of the piece being laminated.

Flexible magnets, also known as refrigerator magnets, are common in the industry and are manufactured in a variety of sizes, shapes & thicknesses. Flexible magnets are used in a wide variety of applications which would include advertising, educational material, car graphic signs, sports schedules and photography. In general, a flexible magnet is comprised of a printed image on the face of the magnet and the magnetic material on the reverse of the magnet. For a magnet to function as a magnet, it must have the ability to hold itself onto a metal surface unaided by any force other than the magnetized magnetic particles within the flexible magnetic material. In most instances, the machinery needed to produce quality flexible magnets is cost prohibitive to individuals, schools or small printing facilities. Persons in these and other fields have limited access to devices conductive to producing flexible magnets with decorative fronts of their choice. One device noted is composed of a sheeted piece of flexible magnetic material which has a coating of pressure sensitive adhesive layered on one of the flat sides of the magnetic sheet; this adhesive is protected, until the time of use, by a silicone coated release liner. At the time of use, the user peels off the silicone release liner, applies the decorative front or photograph, applies sufficient pressure and then trims the art out of the master sheet. Drawbacks related to this process include the time needed to produce multiple pieces and the lack of any protective covering on the face surface of the art. Other devices are available offering an economical way to produce flexible magnets. This would include small laminating machinery that has a removable cartridge which houses a roll of adhesive coated magnet material on the bottom and a roll of adhesive coated transparent film on the top. In this device, the decorative front is passed through the laminating device, the flexible magnet and film are unwound onto the art and the materials are laminated together in a set of pressurized nip rolls. One drawback with this device is that the user is limited to using a specific cartridge for a specific machine.

In view of the foregoing, it is the object of the present invention to provide a laminatable magnetic pouch allowing anyone owning one of the many types of pouch laminators in the marketplace with the ability to make flexible magnets. The object of the present invention allows for the insertion of a printed sheet or photograph between the layers of the magnetic pouch, the pouch is passed through a pouch laminator forming a single structure. This finished magnetic art is permanently laminated as a single structure, any attempt to remove the laminated sheet or photograph will cause permanent damage to the finished piece.

SUMMARY OF THE INVENTION

In view of the foregoing, it is one object of the present invention to provide a laminating pouch apparatus designed to make decorative flexible magnets. It is another object of the invention to demonstrate a laminatable magnetic pouch consisting of multiple layers. It is another object of the invention to demonstrate a laminatable magnetic pouch consisting of multiple layers sealed along one peripheral edge. It is another object of the invention to demonstrate a structure in which a printed sheet or photograph may be inserted between the layers of the invention, passed through a laminating device consisting of heated rolls, thus creating a single laminated structure consisting of a transparent layer on the face of the art and a functional magnetic material on the back of the art. It is another object of the invention to demonstrate an apparatus capable of producing decorative flexible magnets which adhere to any magnet accepting metal surface, using any printed art or photograph; the invention is capable of being run on any type of pouch laminating machinery available in the marketplace. It is another object of the invention to demonstrate a magnetic pouch structure which allows for the manufacture of a flexible magnets laminated into a single structure capable of further trimming or die cutting into shapes. It is another object of the invention to demonstrate a metalized or holographic adhesive layer on the inside surface of the magnetic material; in this structure, a transparent or translucent sheet of printed art can be processed with the finished result of a backlit appearance. It is another object of the invention to demonstrate the option for an opaque, preferably white, background on the reverse side of the magnetic material; this background allows for the printing, decorating or handwriting on the reverse side of the finished magnet; a surface which is usually opaque black. It is another object of the present invention to demonstrate a white or different colored surface on the inside surface of the magnetic material suitable as a cosmetic enhancement of the art.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a laminatable, sealable pouch with a magnetic backing sheet 1, enabling end-users to easily produce custom magnets for display on their refrigerators, vehicles, drawing boards or other magnetic surfaces. The present invention primarily comprises a magnetic backing sheet 1 consisting of a flexible magnetic substrate coated on the entirety of its inside layer with a thermally activated adhesive, preferably a thermoplastic resin. A second substrate, consisting of a transparent film coated on the entirety of its inside layer with a like thermally activated adhesive. The inner adhesive coated magnet material and the inner adhesive coated transparent film are bound together by a single seal transversing one peripheral edge.

Figure 3:
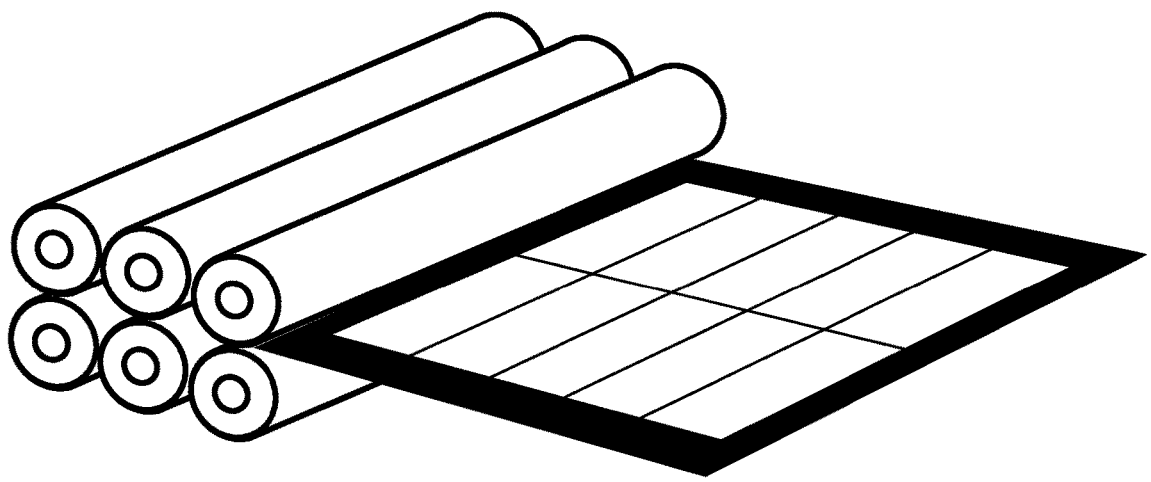
FIG. 3 is a side illustration of the laminating process of the present invention.

The present invention primarily comprises a magnetic backing sheet 1 and a cover sheet 2 which are preferably, but not limited to, rectangular in shape, with one of the four edges initially being bonded together to create a laminatable, sealable pouch. A media substrate 13 such as printed paper, plastic, a photograph, a business card or another item is placed within the pouch and laminated together using a pouch laminating device, or any device capable of pressure laminating structures together, resulting in a singular unit. Any applicable method may be utilized in the laminating process, depending on the type of adhesive used within the pouch. Examples would include heating the layers together using a thermal adhesive or pressing the layers together using a pressure sensitive adhesive. The final product is a laminated flexible magnet or refrigerator magnet. One means of laminating is illustrated in FIG. 3. After the laminating process, the present invention is formed into a singular structure formed as a composite of the various layers bonded together.

Figure 1:
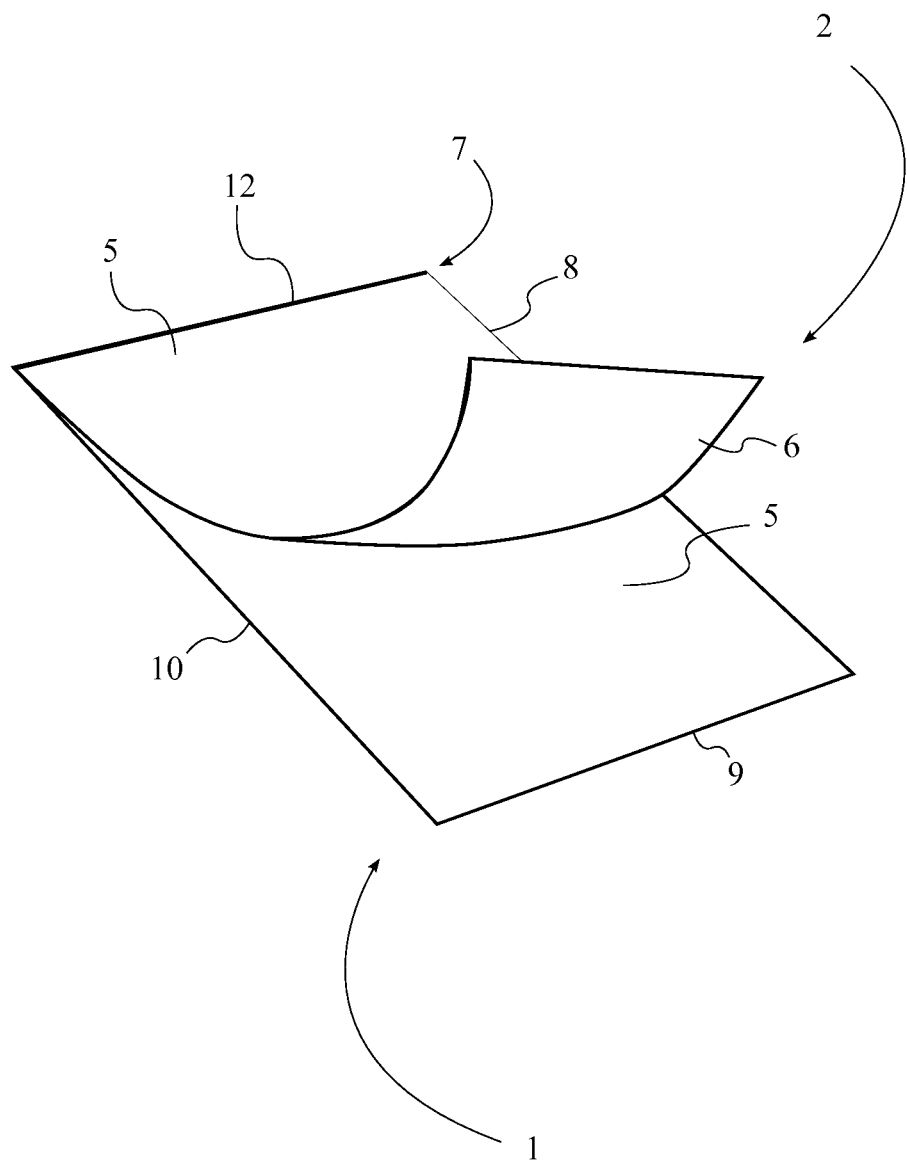
FIG. 1 is a top-side perspective illustration of the present invention.

Referring to FIG. 1, the preferred embodiment of the present invention comprises a magnetic backing sheet 1 and a cover sheet 2. The cover sheet 2 is light transmissive, being made of any applicable material for achieving the object of the present invention, such as, but not limited to, PET, OPP, PVC, PLA, nylon, cellulose acetate, or other materials, in order to form a transparent overlay. In the preferred embodiment of the present invention, the cover sheet 2 is a laminating film sheet.

The magnetic backing sheet 1 and cover sheet 2 are laminatable together through adhesive layers covering the magnetic backing sheet 1 and the cover sheet 2. Upon laminating the magnetic backing sheet 1 and the cover sheet 2 together around the media substrate 13, a singular composite structure is formed, with all the layers being bonded together by the lamination process.

Figure 2:
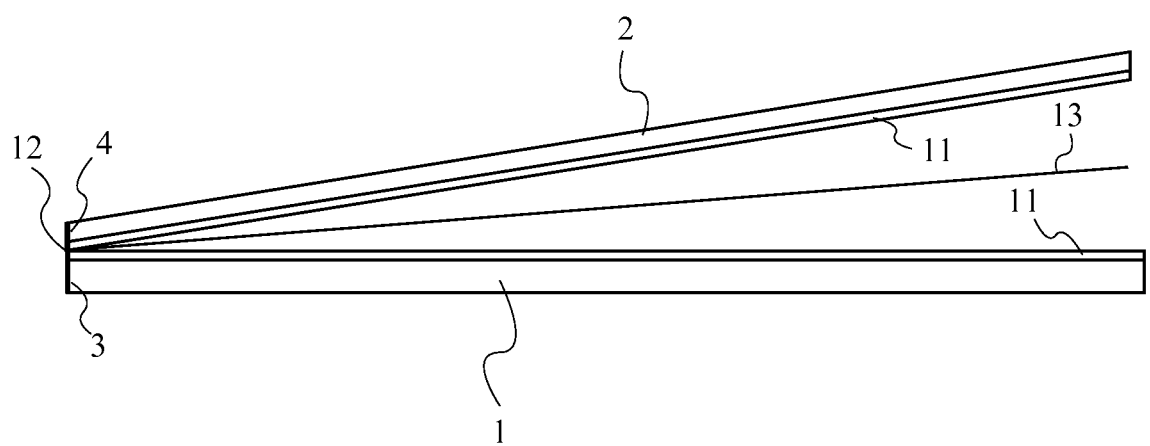
FIG. 2 is a side sectional illustration of the present invention showing the thermal adhesive layers and the thermal adhesive bond.

The cover sheet 2 is layered adjacent to the magnetic backing sheet 1. The magnetic backing sheet 1 comprises a first seal edge 3, and the cover sheet 2 comprises a second seal edge 4. The first seal edge 3 of the magnetic backing sheet 1 is positioned on a perimeter of the magnetic backing sheet 1, and the second seal edge 4 of the cover sheet 2 is similarly positioned on a perimeter of the cover sheet 2. Alternatively stated, the first seal edge 3 traverses a portion of the perimeter of the magnetic backing sheet 1, and the second seal edge 4 traverses a similarly dimensioned portion of the perimeter of the cover sheet 2. The first seal edge 3 and the second seal edge 4 are positioned coincident with each other and are connected to each other. In the preferred embodiment, the first seal edge 3 and the second seal edge 4 are connected to each other by a thermal adhesive bond 12, as seen in FIG. 2. In another embodiment, the first seal edge 3 and the second seal edge 4 are connected to each other by a glued bond. Alternate embodiments may utilize any other useful or preferred material or method to seal the cover sheet 2 to the magnetic backing sheet 1.

The construction of the magnetic pouch form of the present invention is best shown in the detail sectional view of FIG. 2, which shows the media substrate 13 inserted into the pouch formed by the magnetic backing sheet 1 and the cover sheet 2 before the lamination process is carried out. The ratio between the thicknesses of the layers are for demonstration purposes only and are exaggerated. The flexible magnetic material 1 supports a thermal adhesive layer 11. The transparent film 2 supports a thermal adhesive layer 11. The two outer substrates, the magnetic backing sheet 1 and the cover sheet 2 are held together by a single seal, the thermal adhesive bond 12, thus creating a laminatable magnetic pouch. In the preferred embodiment of the present invention, the thermal adhesive layer 11 is a thermoplastic adhesive layer. In other embodiments, the thermal adhesive layer 11 may be any other type of thermal adhesive layer conducive to the purpose and function of the present invention.

The first seal edge 3 and the second seal edge 4 should ideally not traverse more than approximately a quarter of the perimeter of the magnetic backing sheet 1 and the cover sheet 2 in order to accommodate the insertion of a media substrate 13, such as a photograph, between the magnetic backing sheet 1 and the cover sheet 2.

In the preferred embodiment of the present invention, the magnetic backing sheet 1 and the cover sheet 2 are rectangular in shape, flat, and flexible. Thus, the magnetic backing sheet 1 and the cover sheet 2 each comprise a top surface 5, a bottom surface 6, a first edge 7, a second edge 8, a third edge 9, and a fourth edge 10. Being layered adjacent to each other, the top surface 5 of the magnetic backing sheet 1 is positioned adjacent to the bottom surface 6 of the cover sheet 2.

As shown in FIGS. 1-2, the top surface 5 of the magnetic backing sheet 1 and the bottom surface 6 of the cover sheet 2 are covered with a thermal adhesive layer 11 in order to facilitate the lamination process. The thermal adhesive layer 11 may be any adhesive that can be utilized in any applicable lamination process, such as, but not limited to, a thermal lamination adhesive, a pressure lamination adhesive, or another type of known or future lamination adhesive.

The first edge 7 and the third edge 9 of the magnetic backing sheet 1 and the cover sheet 2 are oriented parallel to each other and positioned opposite each other across the magnetic backing sheet 1 and the cover sheet 2. Similarly, the second edge 8 and the fourth edge 10 are oriented parallel to each other and positioned opposite each other across the magnetic backing sheet 1 and the cover sheet 2. The first edge 7 and the third edge 9 are connected perpendicularly to the second edge 8 and the fourth edge 10. The first edge 7, second edge 8, third edge 9, and fourth edge 10 make up the perimeter of the magnetic backing sheet 1 and the cover sheet 2 moving in a clockwise direction around the perimeter. The first edge 7 of the magnetic backing sheet 1 at the top surface 5 of the magnetic backing sheet 1 is connected to the first edge 7 of the cover sheet 2 at the bottom surface 6 of the cover sheet 2. Hence, the first edge 7 of the magnetic backing sheet 1 is the first seal edge 3, and the first edge 7 of the cover sheet 2 is the second seal edge 4. The first seal edge 3 and the second seal edge 4 are sealed together by the thermal adhesive bond 12.

The top surface 5 and the bottom surface 6 of both the magnetic backing sheet 1 and the cover sheet 2 are positioned parallel and opposite each other on both the magnetic backing sheet 1 and the cover sheet 2.

Figure 4:
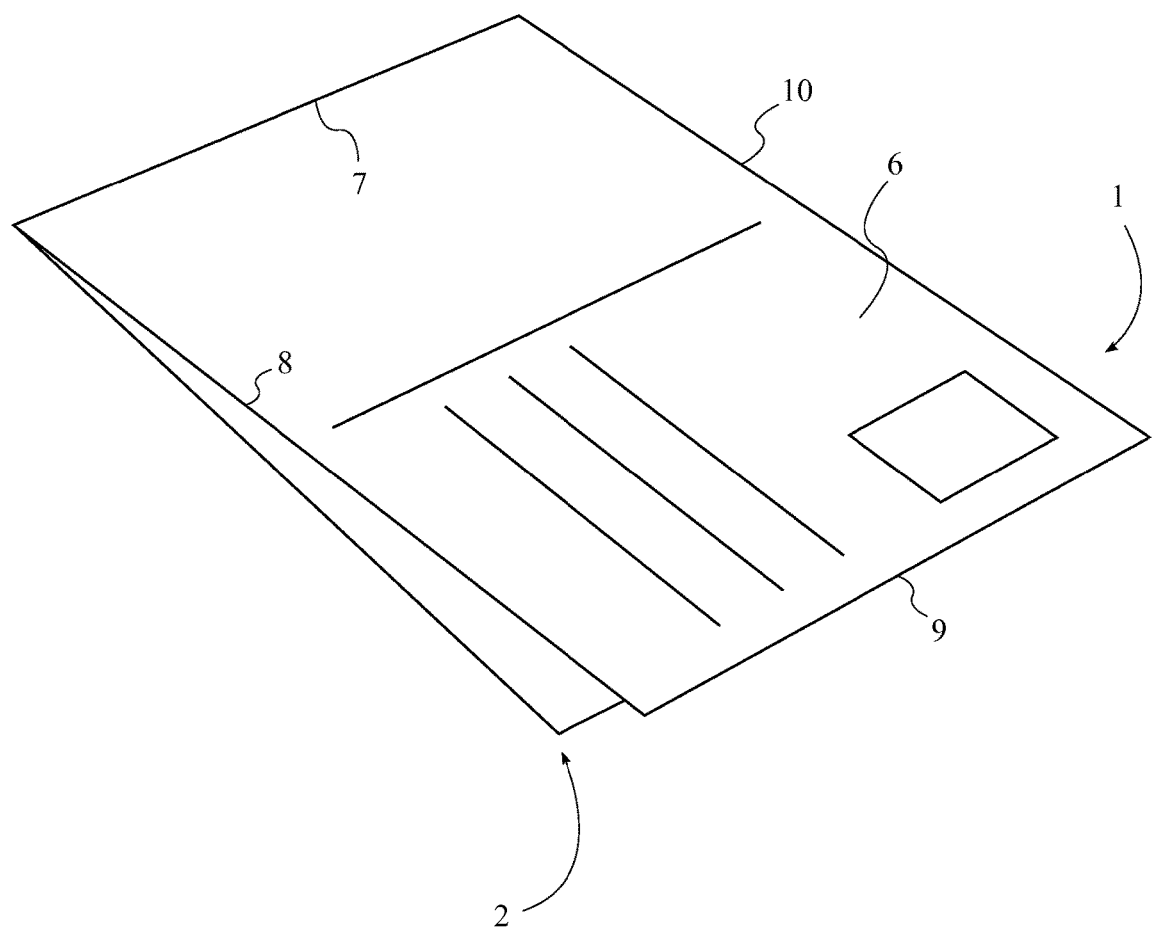
FIG. 4 is a bottom-side illustration of the laminating process of the present invention.

Another embodiment of the invention, shown in FIG. 4, provides for an opaque white coating on the reverse side of the magnet material. This white surface allows for writing, printing or personalization of the finished magnet. The white, or other color, coating may be printed by the manufacturer prior to the production of the magnetic pouch, an example provided is a generic postcard matrix, and/or it may be hand imprinted after the finished magnet has been produced. In this construction, a magnetic pouch with a generic postcard matrix on the reverse side could be used to create a postcard magnet using a standard photograph. After the postcard magnet has been produced, it would be possible to add a hand written note, address and stamp. The final product can then be mailed.

More particularly, in reference to FIG. 4, one embodiment of the present invention additionally comprises a printable and writeable surface. The printable and writeable surface is positioned on the bottom surface 6 of the magnetic backing sheet 1 opposite the cover sheet 2. The printable and writeable surface enables the end-user to make a drawing, write a personalized message, or make another type of hand-inscribed image onto the present invention. One context the printable and writeable surface is particularly useful for is for making a mailable, magnetic postcard. The printable and writeable surface is preferably white, being made of typical writing paper or an opaque coating, but may be made of any material which is suitable for writing on. In another embodiment of the present invention, the top surface 5 of the magnetic backing sheet 1 comprises a metalized surface. In another embodiment, the top surface 5 of the magnetic backing sheet 1 comprises a holographic surface. In other embodiment, top surface 5 of the magnetic backing sheet 1 may be colored white or another color other than white.

It should be noted that the present invention should not be limited in size or shape. In alternative embodiments, the magnetic backing sheet 1 and the cover sheet 2 may take any number of alternate shapes, such as, but not limited to, circular, ovular or triangular.

To utilize the present invention, the end-user first selects a desired media substrate 13 to create a decorative flexible magnet from, such as a photo, magazine or newspaper clipping, business card, or another desired material. Next, the cover sheet 2 is lifted away from the magnetic backing sheet 1, the media substrate 13 is placed between the magnetic backing sheet 1 and the cover sheet 2 so that the media substrate 13 is completely contained within the pouch formed by the magnetic backing sheet 1 and the cover sheet 2. The cover sheet 2 is then replaced to its original position, this time overlaid with the media substrate 13 and the magnetic backing sheet 2 to form a prepared unlaminated pouch. The prepared unlaminated pouch is then run through a pouch lamination machine and excess material is cut away from the resulting bonded layers, producing the final product of a decorative magnet. The magnetic laminated pouch is ready for use and can be affixed to any magnetic surface for decoration.

The method for manufacturing the present invention is as follows. The magnet pouch of the present invention is manufactured on a customized roll laminating system. Flexible magnet material is supplied in a roll form; the material is not magnetized and is not yet magnetic. The roll of flexible magnet material is unwound into a set of driven laminating nip rolls. On the top face of the magnetic material, a layer of thermal adhesive is applied.

After the thermal adhesive layer has been laminated to the flexible magnet material in a set of laminating nip rolls, the web passes over a set of cooling fans which disperse ambient air over the top face and the bottom face of the web.

From the cooling section, the adhesive coated magnetic material is pulled over a roll magnetizing device; this device aligns the magnetic particles found in the flexible magnet material thus creating a functional magnet.

From the magnetizing device, the web moves to the trimming station. In the trimming station, a second roll of laminating film is unwound and brought into contact with the top face of the adhesive coated magnetic material. The second material consist of a transparent sheet, in this case polyester film, coated on the bottom face with a thermoplastic heat activated adhesive. The magnetic web and the newly introduced top web are pulled together in a non-heated driven nip. Once the two webs are brought together, a cutting mechanism is activated and the web is trimmed into a dimensional sheet form. Within the cutting blade mechanism, there exist a heated clamp mechanism. When the blade is activated, the clamp is brought into contact with the top transparent/adhesive web and the bottom adhesive coated magnet. Employing heat, pressure and dwell time, the two webs are fused together creating a seal line. The web is simultaneously sealed and cut during this determined action; the seal and cut are executed perpendicular to the web direction. Once the seal and cut have been made, a signal is sent to the trimming device and the web is advanced a determined length. The process is repeated creating multiple pieces of the same determined size and characteristics.

After the making of these master size magnetic pouches in the aforementioned process, the stacks of magnetic pouch material can be moved to a shear cutting device for trimming in stack form into specific sizes.

Although the invention has been explained in relation to its preferred embodiment, it is to be understood that many other possible modifications and variations can be made without departing from the spirit and scope of the invention as hereinafter claimed.

What is claimed is:

1. A laminatable magnetic pouch comprising:
a magnetic backing sheet;
a cover sheet;
a media substrate;
the magnetic backing sheet, the cover sheet and the media substrate each being flexible;
the magnetic backing sheet comprising a magnetic substrate and a backing adhesive layer;
the cover sheet comprising a transparent film and a covering adhesive layer;
the magnetic substrate and the transparent film each comprising a top surface, a bottom surface and a peripheral edge, the top surface and the bottom surface being oppositely located to each other, the peripheral edge being formed in between the top surface and the bottom surface;
the peripheral edge of the magnetic substrate and the peripheral edge of the transparent film being coincided with each other;
the backing adhesive layer being coated on an entirety of the top surface of the magnetic substrate;
the covering adhesive layer being coated on an entirety of the bottom surface of the transparent film;
a portion of the backing adhesive layer extending along and adjacently located to the peripheral edge of the magnetic substrate and a portion of the covering adhesive layer extending along and adjacently located to the peripheral edge of the transparent film being adhered to each other via an adhesive bond;
the media substrate being placed in between the top surface of the magnetic substrate and the bottom surface of the transparent film;
the media substrate being adhered to the backing adhesive layer and the covering adhesive layer;
the media substrate being adjacently located to the adhesive bond; and
the magnetic backing sheet, the cover sheet and the media substrate being integrated into a singular structure.

2. The laminatable magnetic pouch as claimed in claim 1 comprising:
an opaque white coating;
the opaque white coating being disposed on the bottom surface of the magnetic substrate; and
the magnetic backing sheet, the cover sheet, the media substrate and the opaque white coating being integrated into the singular structure.

3. The laminatable magnetic pouch as claimed in claim 1 comprising:
the top surface of the magnetic substrate and the bottom surface of the magnetic substrate being oriented parallel to each other; and
the top surface of the transparent film and the bottom surface of the transparent film being oriented parallel to each other.

4. The laminatable magnetic pouch as claimed in claim 1 comprising:
the magnetic backing sheet and the cover sheet each being rectangular in shape.

5. The laminatable magnetic pouch as claimed in claim 1 comprising:
the magnetic backing sheet and the cover sheet each being circular in shape.

6. The laminatable magnetic pouch as claimed in claim 1 comprising:
the magnetic backing sheet and the cover sheet each being ovular in shape.

7. The laminatable magnetic pouch as claimed in claim 1 comprising:
the magnetic backing sheet and the cover sheet each being triangular in shape.

8. The laminatable magnetic pouch as claimed in claim 1 comprising:
the backing adhesive layer and the covering adhesive layer each being a thermal sensitive adhesive.

9. The laminatable magnetic pouch as claimed in claim 8 comprising:
the adhesive bond being formed by heating the backing adhesive layer and the covering adhesive layer.

10. The laminatable magnetic pouch as claimed in claim 1 comprising:
the backing adhesive layer and the covering adhesive layer each being a pressure sensitive adhesive.

11. The laminatable magnetic pouch as claimed in claim 10 comprising:
the adhesive bond being formed by pressing the backing adhesive layer and the covering adhesive layer.

* * * * *